(12) United States Patent
Bachmair

(10) Patent No.: US 7,007,451 B2
(45) Date of Patent: Mar. 7, 2006

(54) METHOD OF MAKING A TOOTHED CHAIN WITH WEAR-REDUCING CHAIN JOINTS

(76) Inventor: Peter Bachmair, Valleystr. 29, 81371 Muenchen (DE)

( * ) Notice: Subject to any disclaimer, the term of this patent is extended or adjusted under 35 U.S.C. 154(b) by 135 days.

(21) Appl. No.: 10/755,866

(22) Filed: Jan. 12, 2004

(65) Prior Publication Data

US 2004/0214673 A1 Oct. 28, 2004

Related U.S. Application Data

(63) Continuation of application No. 09/558,610, filed on Apr. 26, 2000, now abandoned.

(30) Foreign Application Priority Data

May 6, 1999 (DE) ............................... 199 20 989

(51) Int. Cl.
*F16G 13/02* (2006.01)
*F16G 13/06* (2006.01)
(52) U.S. Cl. ............................ 59/35.1; 59/8; 474/231
(58) Field of Classification Search ................ 474/212, 474/213, 214, 217, 231, 233; 59/4, 5, 6, 59/8, 35.1
See application file for complete search history.

(56) References Cited

U.S. PATENT DOCUMENTS

| 2,424,087 A | * | 7/1947 | Focke et al. ................ 474/231 |
| 2,517,497 A | * | 8/1950 | Lauenstein ................... 59/35.1 |
| 2,994,186 A | * | 8/1961 | Morrow ........................... 59/8 |
| 3,084,502 A | * | 4/1963 | Herold ............................ 59/8 |
| 3,092,957 A | * | 6/1963 | Larkin, Jr. ....................... 59/8 |
| 4,265,134 A | * | 5/1981 | Dupoyet .................... 474/231 |

* cited by examiner

Primary Examiner—David Jones
(74) Attorney, Agent, or Firm—Marshall, Gerstein & Borun LLP

(57) ABSTRACT

The present invention relates to a toothed chain comprising plates interconnected on chain joints, in particular tooth plates, each of the chain joints comprising a pin bolt and at least two substantially directly adjacently arranged tooth plates whose aligned joint openings surround a respective pin bolt. The wear characteristics of such a toothed chain shall be improved. To this end, the edge portions of the joint openings are rounded at the opposite sides of at least the outer ones of the adjacently arranged tooth plates for a wear-reducing nestling of the pin bolt in case of load. Furthermore, the invention relates to a method of producing a toothed chain.

7 Claims, 1 Drawing Sheet

METHOD OF MAKING A TOOTHED CHAIN WITH WEAR-REDUCING CHAIN JOINTS

RELATED APPLICATION DATA

This patent is a continuation of and claims priority benefit of U.S. patent application Ser. No. 9/558,610, which was filed on Apr. 26, 2000 now abandoned.

The present invention relates to toothed chains comprising plates interconnected on chain joints, in particular tooth plates, each of the chain joints comprising a pin bolt and at least two substantially directly adjacently arranged tooth plates.

Since more and more importance is attached to low-noise drive systems, toothed chains have increasingly been used again in recent years. In these chains at least some plates comprise unilaterally arranged teeth that can be brought into engagement with a chain gear. The tooth shape which is adapted to the geometry of the used chain gears allows a rolling movement of the tooth flanks of the tooth plates on the tooth flanks of the chain gear. This procedure causes considerably less noise than conventional drive chains.

In most cases the tooth plates including the joint openings arranged therein are produced by way of punching and are then temporarily stored in an intermediate hopper from which they are subsequently supplied via known conveying means, such as vibration conveyors or the like, to the mounting unit. In most cases joined inner and outer chain links are alternating, the outer chain links comprising normal plates without teeth that are interconnected via pin bolts. On the pin bolts the tooth plates are movably arranged between the outer plates of the outer chain link. At least two of the tooth plates are arranged side by side in packages. The number of the tooth plates of the inner chain link is almost exclusively identical with the number of the plates of the outer chain link. The tooth plates of the inner chain link are arranged to be pivotable about the pin bolt. It is true that such designs of toothed chains have proved to be very reliable. However, attempts are here also made to enhance their wear resistance.

It is therefore the object of the present invention to provide a toothed chain of the above-mentioned type which exhibits improved wear characteristics.

This object is achieved according to the invention in that the edge portions of the joint openings are rounded at the opposite sides of at least the outer ones of the adjacently arranged tooth plates for a wear-reducing nestling of the pin bolt in case of load.

During operation the pin bolts are exposed to a bending load because the plates connected to the pin bolts pull in one direction and the tooth plates of the inner link in the other direction. As a result, the pin bolt is deformed accordingly so that increased friction is observed in the area of the opening edges on the outsides of the tooth plates because of said bending action. The opening edges may pass into the pin bolts, thereby weakening the cross-section. The invention is now based on the idea to round the edge portions of the joint openings at the respectively outwardly oriented sides of the at least two adjacently arranged tooth plates in such a manner that the pin bolt which is curved in said area towards the edge portions is no longer exposed to an excessively great edge pressure. A rounding as is intended according to the invention must be distinguished from a simple deburring of the opening edges. It is known that chain plates are tumbled after the punching operation, so that the sharpness of the edges is reduced for reasons of deburring. Such measures, however, have nothing in common with the present invention. To achieve the present improvement it is actually enough when the tooth plates are just provided at one side with such a rounded portion insofar as exterior plates of a plate package are concerned.

It has been found out in tests that a radius of the rounded edge portions may advantageously be 10 to 30% of the thickness of the tooth plates. In frequently used tooth plates this corresponds to a radius of about 0.1–0.3 mm. It should only be mentioned for the sake of completeness that e.g. polygonal shapes approaching optimally rounded shapes can also be used.

A further great advantage, in particular with respect to the technical production, can be achieved in that at least the joint openings of the tooth plates are produced by a punching operation and the rounded edge portion of the joint openings is formed by the punching nip. Because of the mass production of plates, in particular tooth plates, and their subsequent temporary storage, which is undefined as a rule, the tooth plates have so far been installed in an entirely irregular manner. Because of the great number of plates that can be used in a toothed chain, the tooth plates could never be oriented in the way suggested by the invention. The use of the punching nip as a rounded portion offers the advantage that no additional rounded portions have to be produced, but already existing constructional features can be exploited for the desired purposes. However, it is necessary that the tooth plates b oriented in a targeted manner so that the position of the punching nip can be detected in a reliable manner. This will then permit an installation of the plates with the right orientation.

In addition, the tooth plates with the rounded edge portions of the joint openings may comprise an asymmetrically arranged orientation aid or means. Even after an unsorted temporary storage, the correct installation position of the tooth plate can immediately be obtained because such an orientation means can directly be produced during the punching operation. The orientation means must be provided such that a clear distinction can be made between front side and back side of the plate. With the symmetrically oriented teeth of the tooth plate alone, such a distinction is not possible. Preferably, the orientation means can be formed by a nose formed at one side on the tooth plate.

In a preferred embodiment inner chain links and outer chain links can alternately be connected to one another via a respective chain joint, the outer chain link may comprise two parallel pin bolts and parallel plates connecting the same and the inner chain link may comprise at least one tooth plate package formed by at least two of the adjacently arranged tooth plates. Modifications to this basic shape of a toothed chain can easily be made.

Furthermore, the present invention relates to a method of producing a toothed chain comprising the following steps:

punching joint openings out of tooth plates;

sorting and aligning the tooth plates in dependence upon a punching nip of the joint openings;

arranging at least two tooth plates side by side on a pin bolt, the punching nip of the joint openings of the outer ones of the adjacently arranged tooth plates being respectively positioned on the outside.

As already mentioned above, such a sorting and aligning method has so far not been carried out in the prior art. The tooth plates were installed in a substantially uncontrolled manner relative to the punching nip because no importance had been attached to the nip with regard to wear aspects. As a rule, the joint openings and the tooth plates are punched at the same time.

Embodiments of the present invention shall now be explained in more detail with reference to a drawing, in which.

Figure 1:
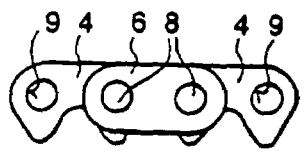
FIG. 1 is a side view showing a section of a toothed chain.
Figure 2:
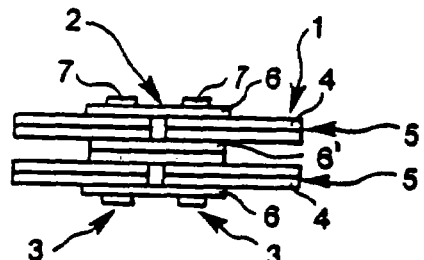
FIG. 2 is a top view on the toothed chain shown in FIG. 1.

FIGS. 1 and 2 show a section of a toothed chain in which inner chain links 1 and outer chain links 2 are alternately provided and interconnected via chain joints 3. The inner chain link 1 consists of four tooth plates 4, of which two respective tooth plates 4 are directly arranged side by side for forming a plate package 5. The outer chain links 2 consist of two normal plates 6 and two tooth plates 6' and of two pin bolts 7 that are arranged in parallel with each other and extend in a direction perpendicular to the plates 6. In the outer chain link 2 two tooth plates 6' are arranged to form a package in the center between the two plate, packages 5 of the inner chain link 1, and two individual plates 6 are respectively arranged outside the tooth plates 4. The plates 6 and the tooth plates 6' comprise two spaced-apart openings 8 to be pressed onto the pin bolts 7 and the tooth plates 4 comprise two spaced-apart joint openings 9 that are arranged with a small play on the pin bolts 7. Thus each of the chain joints 3 is formed by a pin bolt 7 of the outer chain link 2 and the joint openings 9 of the tooth plates 4.

Each tooth plate 4 comprises two unilaterally arranged teeth 10 that are arranged in mirror-symmetrical fashion relative to a center line M of the tooth plate 4. The teeth 10 are correspondingly profiled for engagement with a chain gear in a known manner.

Tooth plates 4 as well as plates 6 and tooth plates 6', are punched members that have been punched out of a steel sheet and are subsequently tumbled for eliminating burrs caused by punching. A heat treatment may follow.

A punching nip 12 (see FIG. 4) which makes the edge or rim portion 13 of the joint opening 9 round is formed on the upper outer surface 11 on account of the punching operation. The opposite edge portion 14 remains sharp-edged due to the punching operation. As becomes apparent from FIG. 4, the tooth plates 4 are arranged such that within a tooth plate package 5 the punching nips 12 of the two plates 4 are each located on the outside, i.e. the sharp edge portions 14 are directly adjoining each other. In the case of larger tooth plate packages such an arrangement will just concern the two outer tooth plates 4.

Figure 3:
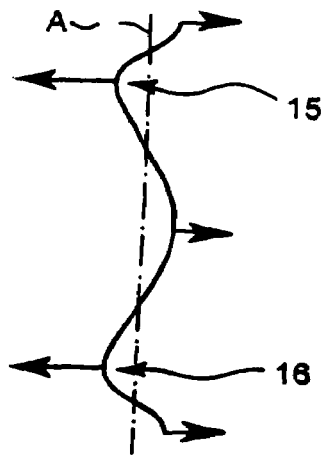
FIG. 3 is an exaggeratedly drawn schematic view showing the deformation of a pin bolt when the toothed chain is subjected to a tensile force.

When a toothed chain as shown in FIGS. 1 and 2 is subjected to a tensile load during operation, the force curve schematically illustrated in FIG. 3 will be observed on the pin bolt shown at the left side in FIG. 2. Such a force curve has the effect that the pin bolt 7 itself is deformed in a similar way. This means that in areas 15 and 16 a deformation which is convex to the ideal line A is observed on the pin bolt 7. Areas 15 and 16 correspond to the portion shown in FIG. 4. In this figure the tooth plates 4 are supported on the pin bolt 7 at one side, thereby deforming the same. As can be seen, the curvature 17 of the pin bolt 7 nestles relatively closely against the joint openings 9 because of the rounded edge portions 13, whereby a contact surface that is as large as possible is created.

Figures 4, 5:
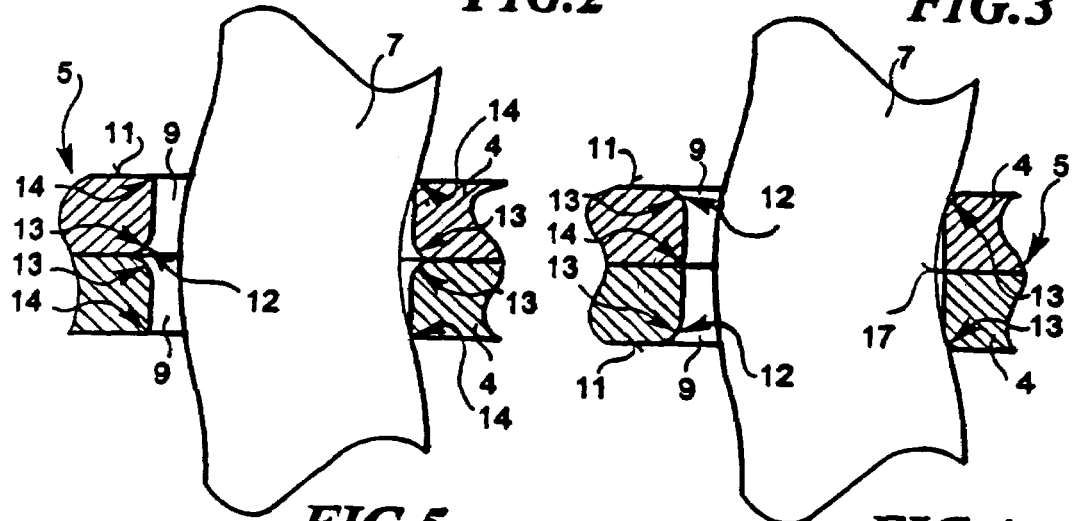
FIG. 4 is a schematic, enlarged cross-sectional view showing the deformed pin bolt in a joint opening of a toothed chain according to the invention.
FIG. 5 is a view similar to FIG. 4, in which the tooth plates are not arranged according to the invention.

In comparison therewith, FIG. 5 shows an arrangement of the tooth plates 4 which is not in accordance with the invention and in which the side surfaces comprising the punching nip 12 are positioned one upon the other and the sharp edge portions 14 are oriented outwards. As can be seen, the sharp-edged portions 14 have only a small contact section with the pin bolt 7, resulting in a nestling contact with the joint opening 9 that is not optimum. The load acting on the contact points is much greater than in the embodiment of the invention as shown in FIG. 4.

Since the pin bolt 7 closely nestles against the edge portions 13, improved wear characteristics are achieved. It must be ensured that all tooth plate packages 5 are arranged in this way. To this end a corresponding sorting operation has to be carried out during production of the toothed chain, so that the tooth plates 4 are installed in the right order.

Figure 6:
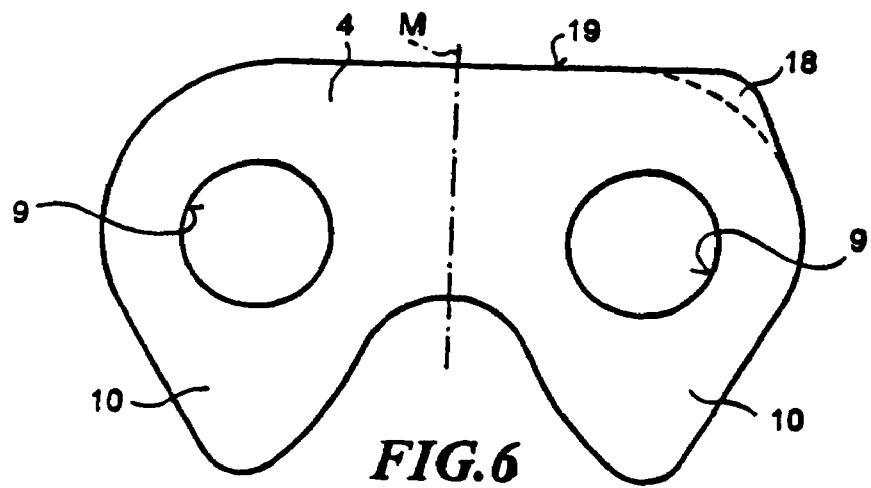
FIG. 6 is an enlarged side view showing a tooth plate with an orientation nose.

To facilitate the installation process, it is suggested according to an embodiment shown in FIG. 6 that a nose 18 should be provided at one side on the tooth plate in extension of the side 19 which is devoid of teeth 10. Said nose 18 is asymmetrical relative to axis M, said asymmetry being producible during the punching operation. As a result, the front side can very quickly be distinguished from the rear side of the tooth plates 4, and a sorting operation is simplified.

In contrast to toothed chains which have so far been produced and in which the tooth plates have so far been installed without any differentiation of the position of the punching nip 12, an improvement of the wear characteristics can be achieved by predetermining the installation position in a targeted manner.

The invention claimed is:

1. A method of forming a continuous silent chain comprising the steps of:
    providing a plurality of plates;
    forming joint openings through said plurality of plates and forming rounded edge portions on at least one side of each plate at each said joint opening;
    arranging said plurality of plates to include subsets of stacks of at least two abutting and adjacent tooth plates;
    intentionally orienting said joint openings such that said rounded edge portions are on outer facing surfaces of each of said stacks of tooth plates;
    aligning respective ones of said joint openings of said plates in each of said stacks of tooth plates; and
    interconnecting said subsets of stacks to form chain joints by inserting a pin bolt through each of said aligned joint openings to form said continuous silent chain.

2. A method according to claim 1, wherein the step of forming further includes forming the rounded edge portions having a radius of between about 10% to about 30% of a thickness of said tooth plates.

3. A method according to claim 1, wherein the step of forming further comprises punching said joint openings via a punching operation whereby said rounded edge portions of said joint openings are formed by a nip as the joint openings are punched.

4. A method according to claim 1, wherein the step of providing further comprises providing each of said tooth plates having an asymmetrically arranged orientation aid.

5. A method according to claim 4, wherein said orientation aid is a nose formed on one side of each of said tooth plates to identify the side of each tooth plate having the rounded edge portions.

6. A method according to claim 1, further comprising the steps of:
   providing a plurality of inner chain links and outer chain links; and
   alternately interconnecting said inner and outer chain links via respective ones of said chain joints, said outer chain links each having two parallel said pin bolts and parallel said plates connecting said two parallel pin bolts, and said inner chain links each formed of at least one of said subsets of tooth plates.

7. A method of forming a continuous silent chain comprising the steps of:
   providing a plurality of plates;
   punching joint openings through each of said plurality of plates;
   sorting and intentionally aligning said plurality of tooth plates dependent upon a punching nip of said joint openings;
   arranging the plurality of tooth plates in subsets of stacks of two or more plates side by side with said punching nip of said joint openings of each outer plate in each stack facing outward and with said joint openings aligned;
   inserting pins bolts through each of said subsets; and
   interconnecting said subsets to form said continuous silent chain.

* * * * *

UNITED STATES PATENT AND TRADEMARK OFFICE
CERTIFICATE OF CORRECTION

PATENT NO. : 7,007,451 B2  Page 1 of 1
APPLICATION NO. : 10/755866
DATED : March 7, 2006
INVENTOR(S) : Peter Bachmair It is certified that error appears in the above-identified patent and that said Letters Patent is hereby corrected as shown below:

<u>On the title page:</u>

Item (30), "199 20 989" should be -- 199 20 989.8 --.

Signed and Sealed this

Ninth Day of January, 2007

JON W. DUDAS
*Director of the United States Patent and Trademark Office*